United States Patent
Li et al.

(10) Patent No.: US 8,027,533 B2
(45) Date of Patent: Sep. 27, 2011

(54) METHOD OF AUTOMATED IMAGE COLOR CALIBRATION

(75) Inventors: Wenjing Li, Honolulu, HI (US); Marcelo Soto-Thompson, Honolulu, HI (US); Ulf Gustafsson, Honolulu, HI (US); Holger Lange, San Diego, CA (US)

(73) Assignee: STI Medical Systems, LLC, LaJolla, CA (US)

( * ) Notice: Subject to any disclaimer, the term of this patent is extended or adjusted under 35 U.S.C. 154(b) by 861 days.

(21) Appl. No.: 12/077,659

(22) Filed: Mar. 19, 2008

(65) Prior Publication Data

US 2008/0240558 A1    Oct. 2, 2008

Related U.S. Application Data

(60) Provisional application No. 60/919,255, filed on Mar. 19, 2007.

(51) Int. Cl.
*G06K 9/00* (2006.01)
(52) U.S. Cl. ......... 382/167; 382/128; 348/180; 600/103
(58) Field of Classification Search .................. 382/167, 382/128; 348/180; 600/103
See application file for complete search history.

(56) References Cited

U.S. PATENT DOCUMENTS

| | | | |
|---|---|---|---|
| 5,016,173 A | 5/1991 | Kenet et al. | |
| 5,791,346 A | 8/1998 | Craine et al. | |
| 5,836,872 A | 11/1998 | Kenet et al. | |
| 6,101,408 A | 8/2000 | Craine et al. | |
| 6,147,705 A | 11/2000 | Krauter et al. | |
| 6,993,167 B1 * | 1/2006 | Skladnev et al. | 382/128 |
| 7,012,633 B2 | 3/2006 | Jenkins | |
| 7,298,892 B2 * | 11/2007 | Spaulding et al. | 382/167 |
| 2002/0080246 A1 * | 6/2002 | Parulski | 348/225 |
| 2006/0170789 A1 * | 8/2006 | Takahashi et al. | 348/223.1 |
| 2006/0241347 A1 | 10/2006 | Whitehead | |
| 2007/0142707 A1 | 6/2007 | Wiklof et al. | |

FOREIGN PATENT DOCUMENTS

GB    0103831.4    8/2002

OTHER PUBLICATIONS

Wolf, Stephen, "Color Correction Matrix for Digital Still and Video Imaging Systems", U.S. Dept. of Commerce NTIA Technical Memorandum TM-04-406, Dec. 2003, Washington, D.C.

* cited by examiner

*Primary Examiner* — Bhavesh Mehta
*Assistant Examiner* — Eueng-Nan Yeh
(74) *Attorney, Agent, or Firm* — Martin E. Hsia

(57) ABSTRACT

A method of automated image calibration that corrects for non-uniform illumination and calibrates color that is simple, fast, automated, accurate and reliable. A gray balance algorithm is applied to correct for non-uniform illumination and a color calibration algorithm is then applied to calibrate the human subject data. The system has been applied in multiple clinical sites with different instruments.

3 Claims, 7 Drawing Sheets

METHOD OF AUTOMATED IMAGE COLOR CALIBRATION

This application claims priority to U.S. provisional patent application 60/919,255 filed on Mar. 19, 2007.

TECHNICAL FIELD

This invention generally relates to medical imaging and image processing. The invention relates more specifically to correction for non-uniform illumination and color calibration of medical images for use in Computer-Aided-Diagnosis/Detection (CAD) systems.

BACKGROUND ART

Although this invention is being disclosed in connection with cervical cancer, it is applicable to many other areas of medicine. Uterine cervical cancer is the second most common cancer in women worldwide, with nearly 500,000 new cases and over 270,000 deaths annually (IARC, "Globocan 2002 database," International agency for research in cancer, 2002, incorporated herein by reference). Because invasive disease is preceded by pre-malignant Cervical Intraepithelial Neoplasia (CIN), if detected early and treated adequately, cervical cancer can be universally prevented (D. G. Ferris, J. T. Cox, D. M. O'Connor, V. C. Wright, and J. Foerster, *Modern Colposcopy. Textbook and Atlas*, pp. 1-699, American Society for Colposcopy and Cervical Pathology, 2004, incorporated herein by reference).

An automated image analysis system of uterine cervical images analyzes and extracts diagnostic features in cervical images and can assist the physician with a suggested clinical diagnosis. Such a system could be integrated with a medical screening device to allow screening for cervical cancer by non-medical personnel. The system also has potential applications in the screening of, for example, female soldiers, marines and sailors who are deployed in locations where annual Pap testing is not possible. Further, such a system has tremendous potential benefits for screening underserved women in developing countries.

The purpose of a cervical screening method is to identify and rank the severity of lesions, so that biopsies representing the highest-grade abnormality can be taken, if necessary. The examination involves a systematic visual evaluation of the lower genital tract (cervix, vulva and vagina), with special emphasis on the subjective appearance of metaplastic epithelium comprising what is known as the Transformation Zone (TZ) on the cervix. During the exam, a 3-5% acetic acid solution is applied to the cervix, causing abnormal and metaplastic epithelia to turn white ("acetowhite"). Cervical cancer precursor lesions and invasive cancer exhibit certain distinctly abnormal morphologic features that can be identified by the visual examination. Lesion characteristics such as color or opacity, margin shape, blood vessel caliber, intercapillary spacing and distribution, and contour are used by physicians to derive a clinical diagnosis (R. Reid, C. P. Crum, B. R. Herschman, Y. S. Fu, L. Braun, K. V. Shah, S. J. Agronow, and C. R. Stanhope, "Genital warts and cervical cancer. III. Subclinical papillomaviral infection and cervical neoplasia are linked by a spectrum of continuous morphologic and biologic change", *Cancer*, 53, pp. 943-953, 1984, incorporated herein by reference). Lugol's iodine is another contrast solution often used during the exam. The color difference of the iodine staining also assists in differentiating the severity of the lesions.

Similarly, the color and illumination of the cervical images vary with the light sources, the instruments and camera settings, as well as the clinical environment. Consequently, the color of the cervical epithelium may look very different (including normal and abnormal findings) in cervical images acquired with different instruments or at different times. This makes the assessment of the color information very challenging, even for an expert. Using an objective image calibration technique (accompanied by corresponding monitor calibration technique) may help the physician to better assess the information in cervical images in terms of diagnosis and severity, for improvement of the annotation and the use of telemedicine.

The use of digital imaging is revolutionizing medical imaging and enabling sophisticated computer programs to assist the physicians with Computer-Aided-Diagnosis/Detection (CAD). Clinicians and academia have suggested and shown proof of concept to use automated image analysis of cervical imagery for cervical cancer screening and diagnosis (B. L. Craine and E. R. Craine, "Digital imaging colposcopy: basic concepts and applications", *Obstetrics and Gynecology*, 82, pp. 869-873, 1993, incorporated herein by reference; W. Li, V. Van Raad, J. Gu, U. Hansson, J. Hakansson, H. Lange, and D. Ferris, "Computer-aided Diagnosis (CAD) for cervical cancer screening and diagnosis: a new system design in medical image processing", *Lecture Notes in Computer Science, CVBIA* 2005, pp. 240-250, 2005, incorporated herein by reference; M. S. Mikhail, I. R. Merkatz, and S. L. Romney, "Clinical usefulness of computerized colposcopy: image analysis and conservative management of mild dysplasia", *Obstetrics and Gynecology*, 80, pp. 5-8, 1992, incorporated herein by reference). Various image processing algorithms have been developed to detect different colposcopic features, such as acetowhite color (S. Gordon, G. Zimmerman, and H. Greenspan, "Image Segmentation of Uterine Cervix Images for Indexing in PACs", in *Proceedings of IEEE 17th Symposium on Computer-based Medical Systems*, 2004, incorporated herein by reference; H. Lange, "Automatic detection of multi-level acetowhite regions in RGB color images of the uterine cervix", in *Proc.SPIE*, 5747, pp. 1004-1017, SPIE, San Diego, 2005, incorporated herein by reference; and S. Gordon, G. Zimmerman, R. Long, S. Antani, J. Jeronimo, and H. Greenspan, "Content analysis of uterine cervix images: initial steps towards content based indexing and retrieval of cervigrams", in *Proc.SPIE*, 6144, pp. 1549-1556, 2006, incorporated herein by reference), lesion margin (I. Claude, R. Winzenrieth, P. Pouletaut, and J.-C. Boulanger, "Contour Features for Colposcopic Images Classification by Artificial Neural Networks", in *Proc of International Conference on Pattern Recognition*, pp. 771-774, 2002, incorporated herein by reference; V. Van Raad, Z. Xue, and H. Lange, "Lesion margin analysis for automated classification of cervical cancer lesions", in *Proc.SPIE*, 6144, 2006. incorporated herein by reference), and blood vessels (Q. Ji, J. Engel, and E. Craine, "Texture Analysis for Classification of Cervix Lesions", *IEEE Transactions on Medical Imaging*, 19, pp. 1144-1149, 2000, incorporated herein by reference; Y. Srinivasan, D. Hernes, B. Tulpule, S. Yang, J. Guo, S. Mitra, S. Yagneswaran, B. Nutter, B. Phillips, R. Long, and D. Ferris, "A probabilistic approach to segmentation and classification of neoplasia in uterine cervix images using color and geometric features", in *Proc.SPIE*, J. M. Fitzpatrick and J. M. Reinhardt, Eds., 5747, pp. 995-1003, 2005, incorporated herein by reference; and W. Li and A. Poirson, "Detection and characterization of abnormal vascular patterns in automated cervical image analysis", *Lecture Notes in Computer Science: Advances in Visual Computing*, 4292, pp. 627-636, November 2006, incorporated herein by reference). On the other hand, lack of color calibration makes it very difficult to extract the color property of the acetowhite lesions properly. Non-uniform illumination and light distribution also has been a major obstacle in extracting lesion margins and blood vessel structures compared to the colposcopic annotations.

CAD on cervical imagery could have a direct impact on improving women's health care and reducing the associated costs. Accurate color calibration is a crucial factor in developing a CAD system for cervical imagery. Several image enhancement techniques, such as histogram stretching and/or equalization, have been used as an attempt to compensate for the illumination problem (Y. Srinivasan, D. Hernes, B. Tulpule, S. Yang, J. Guo, S. Mitra, S. Yagneswaran, B. Nutter, B. Phillips, R. Long, and D. Ferris, "A probabilistic approach to segmentation and classification of neoplasia in uterine cervix images using color and geometric features", in *Proc. SPIE*, J. M. Fitzpatrick and J. M. Reinhardt, Eds., 5747, pp. 995-1003, 2005, incorporated herein by reference; S. Yang, J. Guo, P. King, Y. Sriraja, S. Mitra, B. Nutter, D. Ferris, M. Schiffman, J. Jeronimo, and R. Long, "A Multi-Spectral Digital Cervigram™ analyzer in the wavelet domain for early detection of cervical cancer", in *Proc.SPIE*, J. M. Fitzpatrick and M. Sonka, Eds., 5370, pp. 1833-1844, 2004, incorporated herein by reference).

Generally speaking, the colors in an image depend on the light source, the image acquisition device, and the properties of the subject being imaged The red, green, and blue (RGB) color filters of a digital color camera are designed to mimic the color sensitivity of the human eye and are, thus, said to be creating a "true" color image. In reality, the color filter responses are fairly dissimilar to the sensitivity of the human eye, which means that color cameras and the eye represent colors quite differently. Different color representations are especially noticeable under different lighting conditions. Consequently, depending on lighting conditions and camera characteristics, digital color images often are different from what is perceived by human eye. Because colors are very important to how we perceive the world around us, people have studied these differences, including ways to correct them, in great detail. Making the same image look identical, independent of the camera, monitor or printer used, has been a desired outcome ever since the advent of photography. The goal of the present invention and image calibration in general, is to make the colors of a cervical image appear identical, independent of camera settings and light source. This is preferably achieved by mapping the color appearance of the images taken with different instruments into a standard color space, as illustrated in FIG. 1.

Although many of the algorithms described in the present invention are well-known in the art, the inventors are unaware of another simple and robust, color calibration system that both corrects for non-uniform illumination and calibrates the color of images using only one uncalibrated light source, one uncalibrated standard visible light detector, and one color target. The present invention uses the ground truth and native reflectivity (described below) of only the targets, and maps the native reflectivity back to the ground truth reflectivity (described below) without any knowledge of the light source, detector or the environment. The following patents and patent applications may be considered relevant to the field of the invention:

U.S. Pat. No. 7,012,633 to Jenkins, incorporated herein by reference, discloses a color calibration method for an imaging color measurement device utilizing a detector array, a plurality of optical elements, and multiple instances of irradiation of the detector array for a single measurement. A flat-fielding correction error correction matrix of the imaging color measurement device for each instance of irradiation of the detector array is obtained prior to color calibration. The response for each instance of irradiation of the detector array is flat-fielded with the corresponding error matrix to obtain a flat-fielded, spectrally weighted irradiance response for each instance of irradiation of the detector array. An illuminant light source with known spectral output or chromaticity coordinates is measured to obtain an irradiance response of the imaging color measurement device for each instance of irradiation of the detector array. A color correction coefficient is calculated using the known spectral output and chromaticity coordinates of the light source and the corresponding flat-fielded irradiance response.

U.S. Patent Publication No. 2007/0142707 to Wiklof, et al., incorporated herein by reference, discloses an endoscope system and method for providing images of anatomical features imaged using the endoscope system. The system also includes a calibration device having known optical properties. The calibration device is imaged using the endoscope system, and data corresponding to the image is obtained. This data are compared to data corresponding to the known optical properties of the calibration device. Based on this comparison, calibration data corresponding to imaging errors of the endoscope system are obtained and the calibration data are used to calibrate the endoscope system.

U.S. Pat. No. 6,147,705 to Krauter, et al, incorporated herein by reference, discloses a video colposcope which includes a system microcomputer having algorithms for color balance levels stored into memory. A video camera obtains a subject electronic image of a subject object, and using algorithm-driven digital signal processing circuitry (DSP), color saturation, hue, and intensity levels of the subject electronic image are modified according to DSP reference filter algorithm and reference color balance levels as stored, thus producing a modified electronic image corresponding to the subject electronic image. The modified electronic image is outputted to a display in continuous real time as the corresponding subject image is obtained by the video camera. This modified electronic image emulates that obtained through an optical green filter and incorporates a simulated white balance.

U.S. Pat. No. 5,016,173 to Kenet et al., incorporated herein by reference, discloses an improved apparatus and method for in vivo monitoring of visually accessible surfaces of the body. The invention synthesizes methods of systems identification and computer vision to quantify and/or classify features of surface or subsurface anatomic, physiologic, or pathologic structures or processes. Such is accomplished by the stimulation of anatomic surfaces with light (visible, infrared, and/or ultraviolet, structured or uniform), followed by the quantitative analysis of digital images (multiresolution, multiview, and/or multispectral) of reflected or emitted light from the surface of interest.

U.S. Pat. No. 5,836,872 to Kenet, et al., incorporated herein by reference, discloses a method for monitoring a region of a body surface including a method for diagnosis of a premelanomatous or early melanomatous conditions. The color calibration technique used, images a color chart, or set of light emitting diodes, of standard known colors, either during a calibration session or during the acquisition of images of the surface feature under examination. Regions of the image containing known colors may be used to identify the set of pixel values representing that color. This set of pixel values (e.g. reds green and blue pixel values) for an individual known color may then be used to determine input look-up table values, or pixel scaling factors to apply to all pixels of an image that will result in standardization of color between images obtained under similar lighting conditions.

U.S. Pat. No. 6,101,408 to Craine et al., incorporated herein by reference, discloses an apparatus and a method for determining the area of a three-dimensional lesion on a cervix from a two-dimensional image of the cervix.

U.S. Pat. No. 5,791,346 to Craine et al., incorporated herein by reference, discloses an apparatus and method for accurately computing an area on a three-dimensional object from a two-dimensional image data obtained by means of a camera, such as one associated with a digital colposcope.

U.S. Patent Publication No. 2006/0241347 to Whitehead, incorporated herein by reference, discloses an systems and methods relating to colposcopic viewing tubes for enhanced viewing and examination.

DISCLOSURE OF INVENTION

A method of automated image calibration that corrects for non-uniform illumination of a subject and calibrates color using a single uncalibrated instrument light source and single uncalibrated detector for simplicity. A gray target of known ground truth reflectivity, sometimes referred to as reference standard reflectivity, and a color target of known ground truth reflectivity, or reference standard reflectivity (described below), are also used. First, raw images and calibration images are collected under substantially identical illumination conditions. Calibration images, which include both images of the gray target and images of the color target, are obtained when the detector records native reflectivity (described below) of the gray and color targets. The color target contains color patches which have a native position value and a standard position value for the desired color space, as described below. The raw image and calibration image are then preferably converted to another uniform color space. Next, the gray balancing algorithm is applied to the raw image and the image of the color target to produce a gray balanced raw image and a gray balanced image of the color target. These gray balanced images are flat-field images with normalized light distribution. Lastly, color transformation is achieved by extracting the native positions values from the gray balanced image of a color target and using them to determine the native color value for each of the patches. A correction matrix is calculated between the native color values and standard color values, and applied to the gray balanced raw image to correct for color inaccuracies.

BRIEF DESCRIPTION OF DRAWINGS

The preferred embodiments of this invention will be described, with reference to the following figures, wherein.

BEST MODES FOR CARRYING OUT INVENTION

Figure 1:
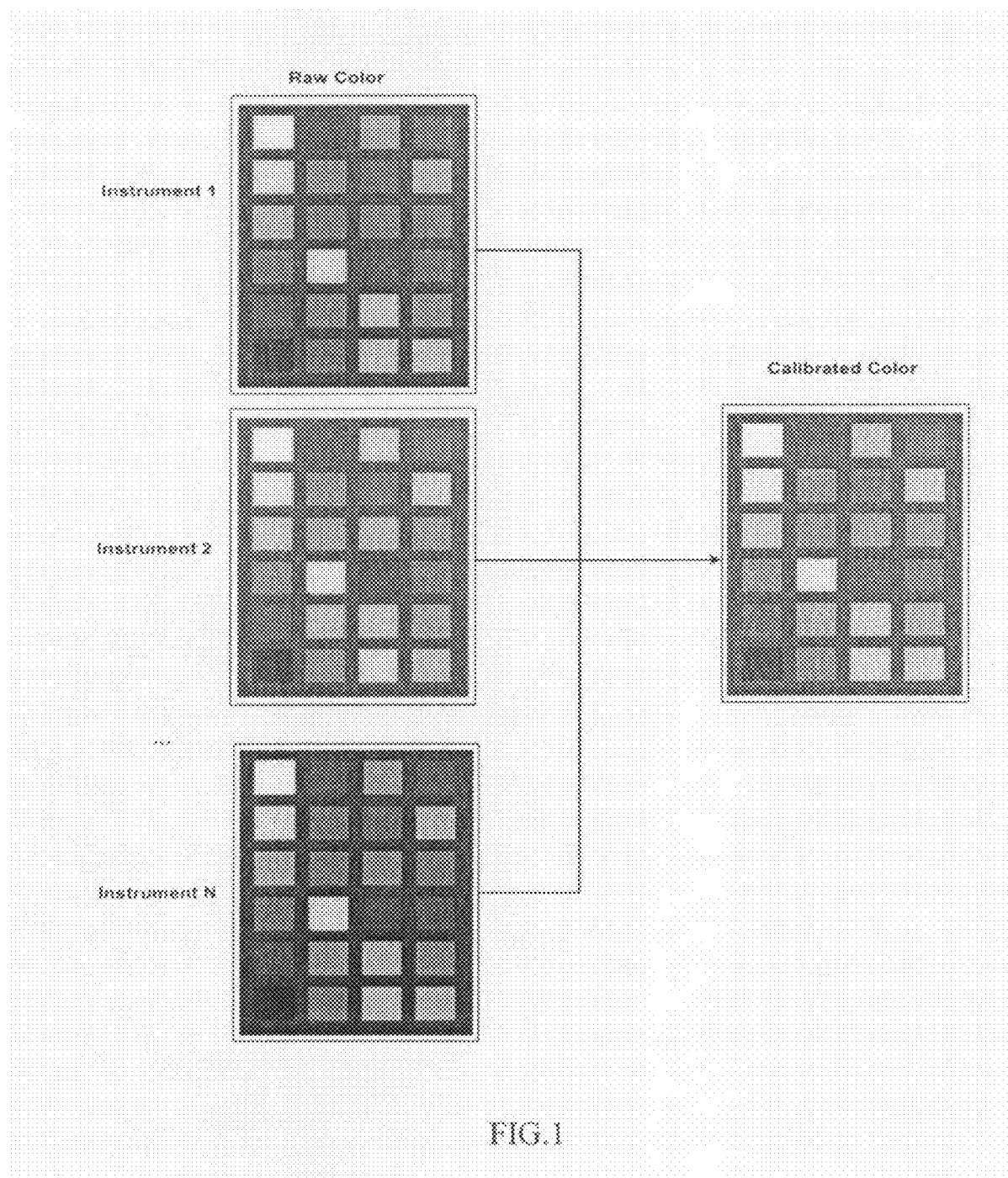
FIG. 1 shows the concept of color calibration: mapping the raw color space of different instruments into a standard color space (defined by a standard light illumination and a standard detector response).

The presently preferred embodiment of the invention provides a method and an apparatus for mapping the color appearance of the images taken with different instruments at different times and locations and transforms them into a standard color space with normalized light distribution. FIG. 1 shows the concept of color calibration: mapping the raw color space of different instruments into a standard color space. The method preferably is performed in the following steps described in more detail below:

1. Collecting raw cervical images and calibration data;
2. Applying gray balancing to both the raw cervical images and calibration data using the gray balance algorithm;
3. Performing color transformation to correct for inaccurate color in the gray balanced raw cervical image using a color correction matrix calculated from the gray balanced calibration data.

Figure 2:
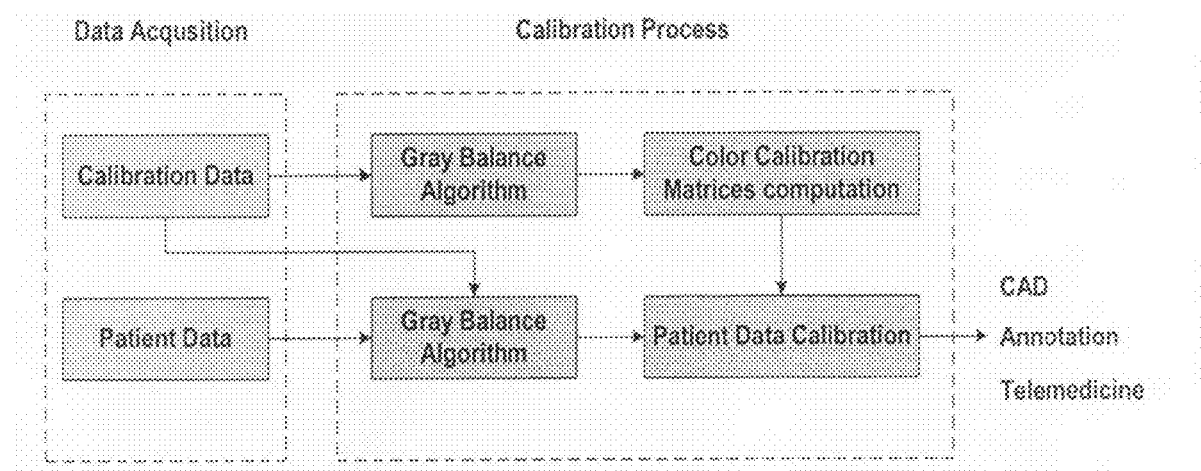
FIG. 2 shows the entire calibration procedure proposed for the colposcopic image calibration. Both human subject data and calibration data are acquired at the clinical sites using the same instrument. Calibration data includes, but is not limited to images of a gray target for gray balance and a color target for color calibration. The image of the color target is processed by the gray balance algorithm to normalize the light distribution. This image is then used to compute the color correction matrices for the color calibration algorithm.

FIG. 2 shows the entire calibration procedure proposed for the colposcopic image calibration.

(1) Collection of Image Data

Figure 3A:
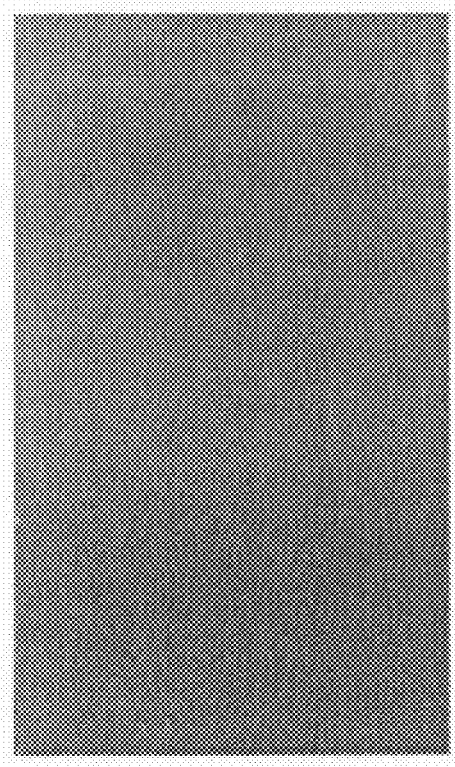
FIG. 3(a) depicts a gray target used for the image calibration technology and FIG. 3(b) shows a color target used for the image calibration technology.
Figure 3B:
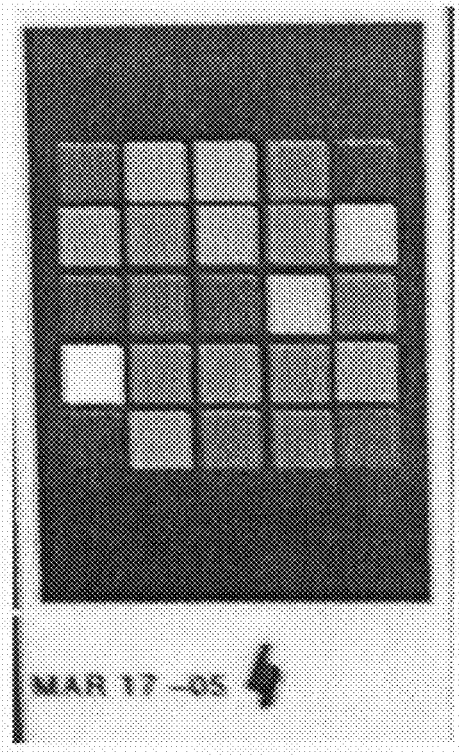

Both human subject raw image data and calibration data are acquired at clinical sites using the same instrument and under identical illumination conditions. To maintain simplicity, the invention preferably utilizes a single uncalibrated light source and an uncalibrated standard visible light detector, with its own built in (inherent) response, to collect the raw data and calibration data. The calibration data includes, but is not limited to, images of a gray target for gray balancing (described below) and images of a color target for color transformation (described below). Both the gray target and color target have a known ground truth reflectivity (reference standard reflectivity) which is usually given by the manufacturer of the targets or measured using a calibrated calorimeter or spectroradiometric instrument. The detector records what is known as the native reflectivity from a gray target or color target (the light directly reflected off of the targets), in comparison to the ground truth reflectivity (ground truth value/reference standard or standard value) of the target(s). FIG. 3 shows the calibration targets used for the image calibration technology.

The color target contains color patches. However, instead of using one color calibration target with a number of color patches, the present invention also can use one target (one color patch) for each color to be calibrated. Therefore, the total operable range is 1-30 color patches. Preferably, the number of color patches should range from 20-30 to accurately mimic the color of the subject of interest.

Preferably, the present invention also uses color patches with a reflectivity that accurately matches cervical tissue, which typically ranges from 5-10% in the blue-green spectral region to 50-70% in the red spectral region (or for other applications, a reflectivity that substantially matches the structure being imaged). Because the inventors wanted to determine the unknown true color of cervical tissue relating to different tissue conditions, the inventors in the preferred embodiment opted to use a standard color target commonly used in color imaging application, the GretagMacbeth color checker.

(2) Gray Balancing

In the present invention, gray balancing (flat fielding) is used to normalize the spatial variations of the light source and the camera responses using a calibrated neutral gray target. Once a detector has been appropriately flat-fielded, a uniform signal will create a uniform output (hence flat-field). This then means any further signal is due from the phenomenon being detected and not a systematic error.

Both the human subject raw image data and the calibration data (specifically, the images of the color target) are processed by the gray balance algorithm (defined below) which uses the images of the gray target to normalize the light distribution to produce gray balanced raw image data and gray balanced images of the color target. Both gray balanced images are flat-field images with a normalized light distribution. By applying a flat-field, the present invention as a whole, both balances the colors and corrects for intensity variations of the lighting.

The gray balance algorithm is based on the following equation (1):

$$C_{gb}(x, y, j) = \frac{C_{raw}(x, y, j) - C_{background}(x, y, j)}{C_{grayflat}(x, y, j) - C_{graydark}(x, y, j)} \times S_c(j) \quad (1)$$

where x and y are the vertical and horizontal pixel positions in the image, j is the color channels, $C_{gb}(x,y,j)$ is the gray balanced image, $C_{raw}(x,y,j)$ is the raw image (either the raw image of the cervix or the raw image of the color target), $C_{background}(x,y,j)$ is the background image that corresponds spatially to the raw image (described above) acquired with ambient light on but with the instrument light off, $C_{grayflat}(x,y,j)$ is the image of the gray target with both ambient light and the instrument light on, $C_{graydark}(x,y,j)$ is the image of the gray target with ambient light on but instrument light off, and $S_c(j)$ is the gray target ground truth value (native) in the corresponding color space. The gray target ground truth value is the "true", or calibrated, color of the gray target. The true color is calculated using a standard light source and detector (and is the color value as defined by CIE, the International Commission on Illumination).

Any background image acquired with the background or room light on should be acquired at a very short time period before or after the acquisition of the raw image, such that field of view remains constant and there is no movement of the background scene. In order to reduce the noise to a minimum in the gray balanced images, multiple gray dark and gray flat images can preferably be taken, and averaged before their use in equation (1) to reduce the overall noise level. Low pass filtering can also be applied to further eliminate the noise.

The gray balance algorithm can, in theory, be applied to the image in any color space. A color model is an abstract mathematical model describing the way colors can be represented as a sequence of numbers, typically as three or four values or color components. The use of RGB space is very common in the digital image processing field, because of the availability of such data sets as they are produced by most color image-capturing devices and they can be directly displayed on a monitor. However, the use of RGB space is not preferred in computer vision applications because it usually has the following drawbacks. First, it has a high correlation among RGB channels for natural images (H. C. Li, "Regularized color clustering in medical image database", *IEEE Transactions on Medical Imaging*, 19, pp. 1150-1155, November 2000, incorporated herein by reference; H. Palus, *Colour spaces*, Chapmann and Hall, 1998, incorporated herein by reference). Second, the representation of RGB is not very close to the way humans perceive colors because humans normally determine color by parameters such as brightness, hue and colorfulness (G. Wyszecki and W. S. Styles, *Color Science: Concepts and Methods, Quantitative Data and Formulae*, New York: Wiley, 1982, incorporated herein by reference). Third, RGB space is not perceptually uniform (S. A. Karkanis, D. K. Iakovidis, D. E. Maroulis, D. A. Karras, and M. Tzivras, "Computer-aided tumor detection in endoscopic video using color wavelet features", *IEEE Trans. Inf. Technol. Biomed.*, 7, pp. 141-152, 2003, incorporated herein by reference).

Figure 4A:
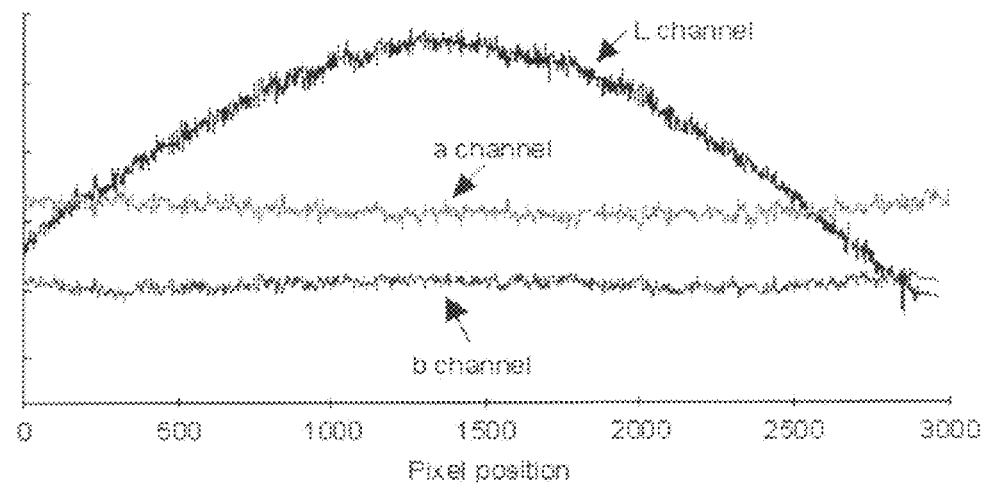
FIG. 4(a) shows the one-dimensional light intensity signal in CIE-Lab color space.
Figure 4B:
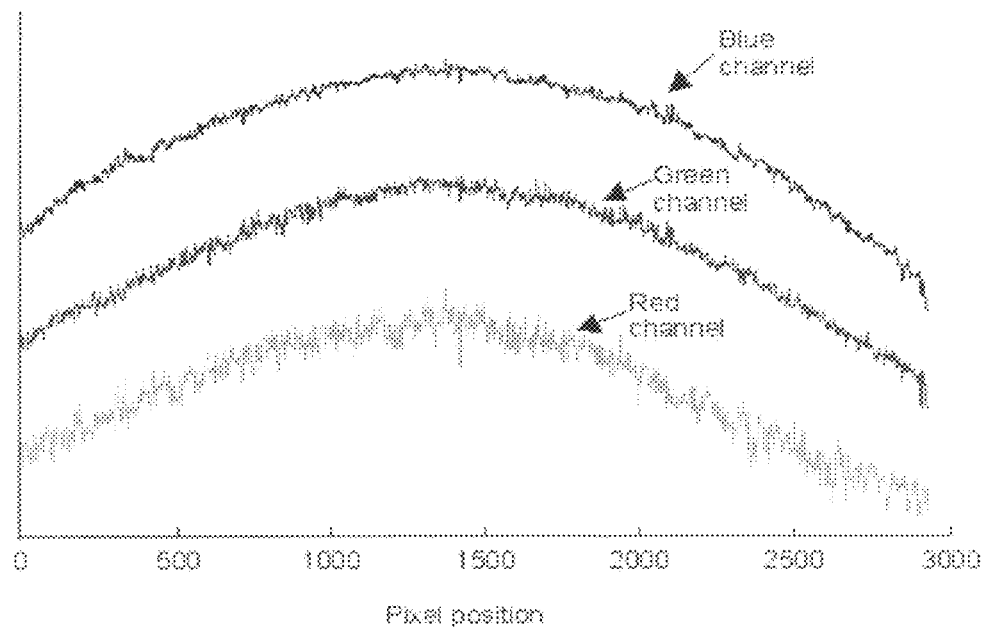
FIG. 4(b) shows the one-dimensional light intensity signal in RGB color space.

The present invention preferably uses CIE-Lab color space because it is a perceptually uniform color space that has proven to perform better than RGB for color texture analysis (G. Paschos, "Perceptually uniform color spaces for color texture analysis: an empirical evaluation", *IEEE Trans. Image Process.*, 10, pp. 932-936, Jun. 2001, incorporated herein by reference). A Lab color space is a color-opponent space with dimension "L" for luminance and "a" and "b" for the color-opponent dimensions. Unlike the RGB, Lab color is designed to approximate human vision. It aspires to perceptual uniformity, and its L component closely matches human perception of luminosity (brightness). It can therefore be used to make accurate color balance corrections by modifying output curves in the a and b components, or to adjust the luminosity contrast using the L component. These transformations are difficult or impossible in the RGB color space. Lab color space has also been applied to cervical image segmentation (S. Gordon, G. Zimmerman, and H. Greenspan, "Image Segmentation of Uterine Cervix Images for Indexing in PACs", in *Proceedings of IEEE 17th Symposium on Computer-based Medical Systems*, 2004, incorporated herein by reference). A computational benefit of CIE-Lab (or any other approximately perceptually uniform space, like CIE-Luv, HSV or HLS) compared to RGB is that the gray balancing only needs to be applied to the luminosity channel of the image (see FIG. 4(*a*). whereas gray balancing must be applied to each color channel in RGB (see FIG. 4(*b*)).

However, because the gray balancing algorithm can be applied to any color space, the present invention also contemplates its use in CIE XYZ, CMYK CIE-Luv, HSV and HSL color space. CIE XYZ (also known as CIE 1931 XYZ and CIE 1931 color space) was one of the first mathematically defined color spaces created by the International Commission on Illumination (CIE) in 1931. The human eye has receptors (called cone cells) for short (S), middle (M), and long (L) wavelengths. Thus, three parameters describe a color sensation. The tristimulus values of a color are the amounts of the three primary colors in a three-component additive color model needed to match that test color. The tristimulus values are most often given in the CIE 1931 color space, in which they are denoted X, Y, and Z, which correspond to red, green and blue, respectively. CIE-Luv color space is designed to be perceptually uniform and is closely related to CIE-Lab color space. In CIE-Luv color space, the opposite a and b color dimensions in CIE-Lab color space are replaced by the color saturation (u) and hue angle (v). CMYK (short for cyan, magenta, yellow, and key (black), and often referred to as process color or four color) is a subtractive color model, used in color printing, also used to describe the printing process itself. Though it varies by print house, press operator, press manufacturer and press run, ink is typically applied in the order of the acronym. The CMYK model works by partially or entirely masking certain colors on the typically white background (that is, absorbing particular wavelengths of light). Such a model is called subtractive because inks "subtract" brightness from white. HSL and HSV color space are two related representations of points in an RGB color space, which attempt to describe perceptual color relationships more accurately than RGB, while remaining computationally simple. HSL stands for hue, saturation, lightness, while HSV stands for hue, saturation, value. HSI and HSB are alternative names for these concepts, using intensity and brightness. Both HSL and HSV describe colors as points in a cylinder whose central axis ranges from black at the bottom to white at the top with neutral colors between them, where angle around the axis corresponds to "hue", distance from the axis corresponds to "saturation", and distance along the axis corresponds to "lightness", "value", or "brightness".

In the present invention, the gray balancing algorithm can be applied to any color space. If a second color space is used, the original RGB image is converted to the preferred color space (using a conversion process as defined by CIE) before applying the gray balancing algorithm.

Figure 5A:
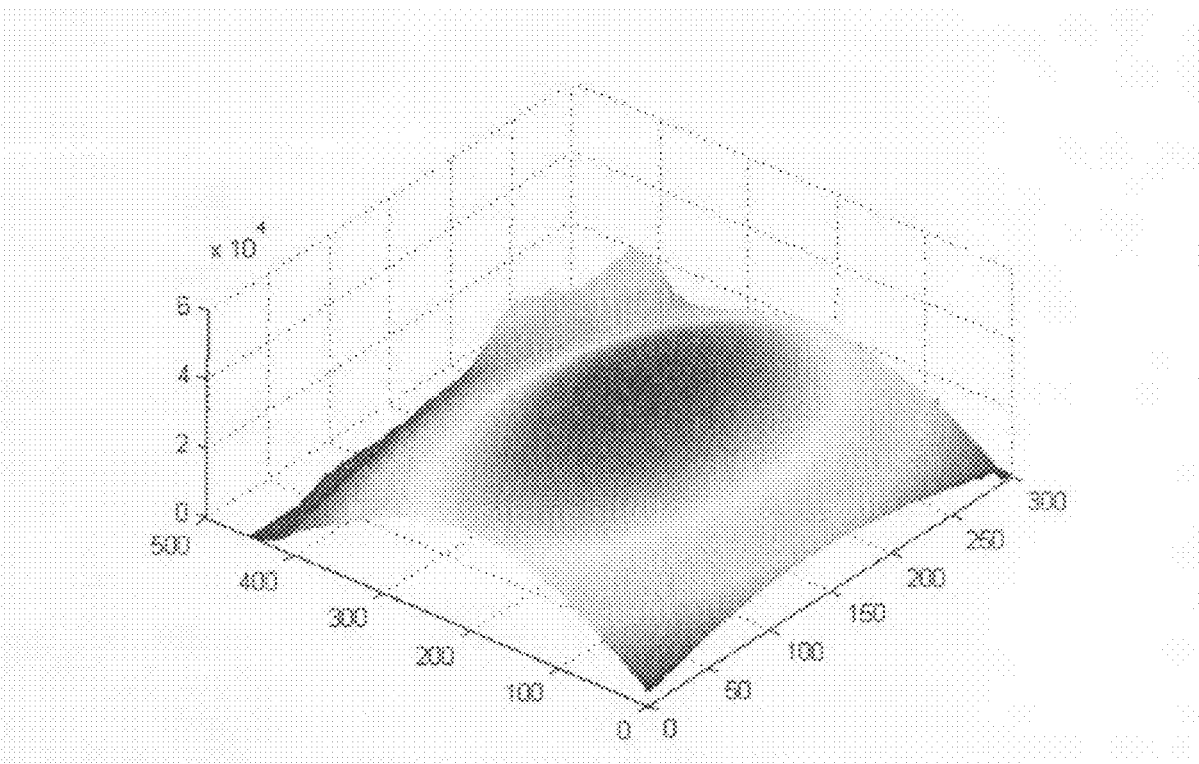
FIG. 5(a) shows the non-uniform distribution of light in color space before applying the gray balance algorithm (a non-uniform distribution) and FIG. 5(b) shows the uniform distribution of light after applying the gray balance algorithm (a corrected distribution).
Figure 5B:
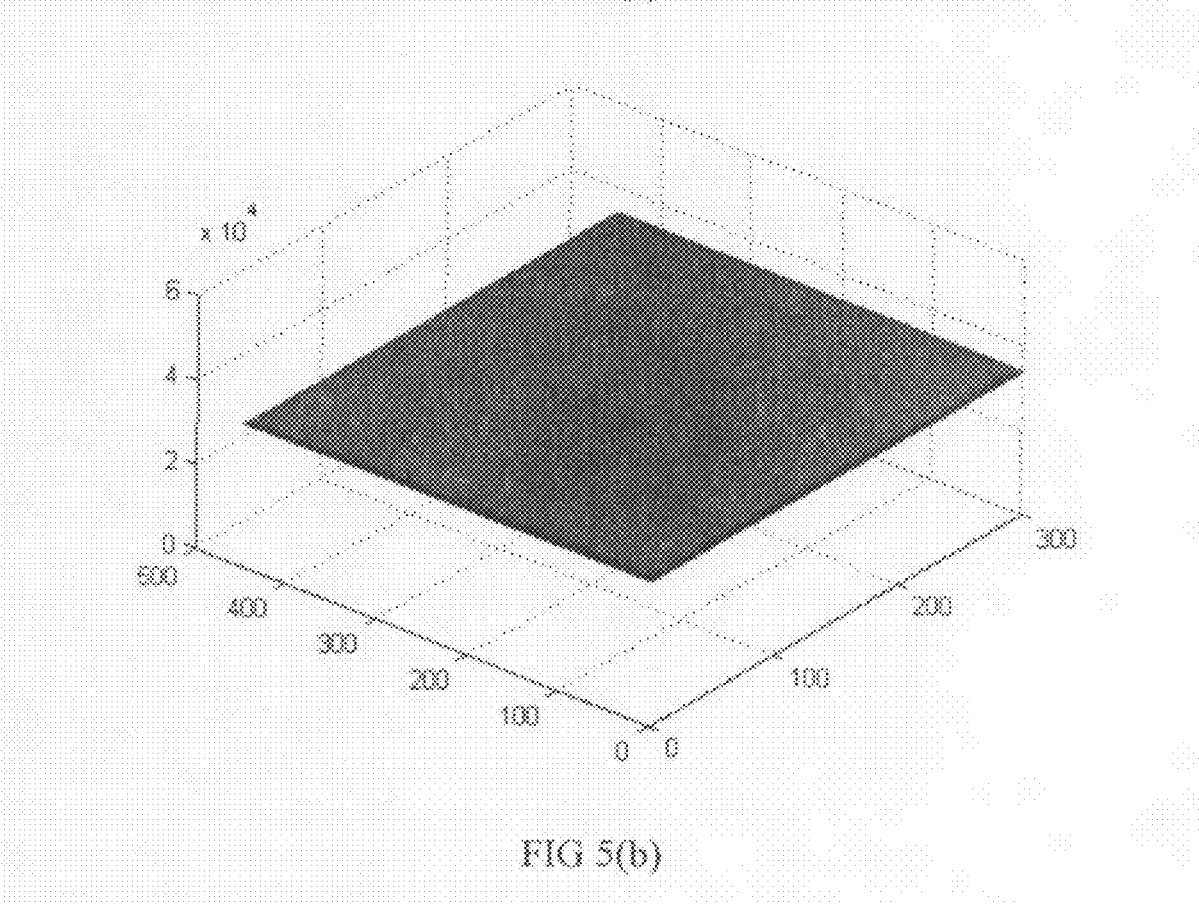

The result of the illumination correction can be visualized in FIGS. 5(a) and 5(b). FIG. 5(a) shows the light distribution of the luminosity channel in the gray flat image (the image of the gray target) before applying the gray balance algorithm. FIG. 5(b) is the corresponding light distribution after applying the gray balance algorithm.

(3) Color Transformation

The first step of color transformation (color calibration) is the automatic extraction of position and color values of the color patches from the gray balanced image of the color target (the flat-field image of the color target with normalized light distribution). The position values are used to determine the color values but the preferred color correction method uses only the color values. Next, a color correction matrix is computed between the extracted values (the native values) and the standard values (the ground truth values or reference standard values) in the preferred color space using a color calibration algorithm. Color transformation is completed by applying the calculated color correction matrix to any raw cervical image to produce a color calibrated cervical image.

The preferred color calibration algorithm used in the present invention is based on work by Wolf (S. Wolf, "Color Correction Matrix for Digital Still and Video Imaging Systems", NTIA Technical Memorandum, TM-04-406, December 2003, incorporated herein by reference), who presented an automatic color correction matrix computation approach for correcting inaccurate color output by digital still and video imaging systems. Such a matrix-based color calibration method is common on imaging devices due to their generally well-behaved performance. A look up table can also be generated from the color correction matrix to speed up the calibration process. The method uses a known reference image together with a robust least square algorithm to estimate the optimal color correction matrix that must be applied to images (the gray balanced raw cervical image) in order to correct for color inaccuracies. Color transformation can be represented by the following equation:

$$\begin{pmatrix} C_{11} & \ldots & C_{1m} \\ C_{21} & \ldots & C_{2m} \\ \ldots & \ldots & \ldots \\ C_{n1} & \ldots & C_{nm} \end{pmatrix} = \begin{pmatrix} 1 & nativeC_{11} & \ldots & nativeC_{1m} \\ 1 & nativeC_{21} & \ldots & nativeC_{2m} \\ \ldots & \ldots & \ldots & \ldots \\ 1 & nativeC_{n1} & \ldots & nativeC_{nm} \end{pmatrix} \begin{pmatrix} a_{11} & a_{12} & \ldots & a_{1m} \\ a_{21} & a_{22} & \ldots & a_{2m} \\ \ldots & \ldots & \ldots & \ldots \\ a_{(m+1),1} & a_{(m+1),2} & \ldots & a_{(m+1),m} \end{pmatrix}$$

(2)

where n is the number of color patches, m is the number of color channels, [C] are the calibrated, or true, colors, [nativeC] are the native colors extracted from the gray balanced image of the color target, and [a] is the m+1 by m color correction matrix. The index i refers to the color patch (i=1, 2, ..., n) and the index j refers to the number of color channels (j=1, 2, ..., m).

A polynomial fitting to the individual color component can also be applied, but is not required, to perform a monotonic non-linear correction of order p according to $$y_j = b_{pj} x_j^p + \ldots + b_{3j} x_j^3 + b_{2j} x_j^2 + b_{1j} x_j + b_{0j} \quad (3)$$

where j again refers to the color channels (j=1, 2, ..., m), [x] denotes the color values of the individual color component before the non-linear correction, [y] denotes the color values after the non-linear correction, and [b] denote the coefficients of the polynomial.

Figure 6A:
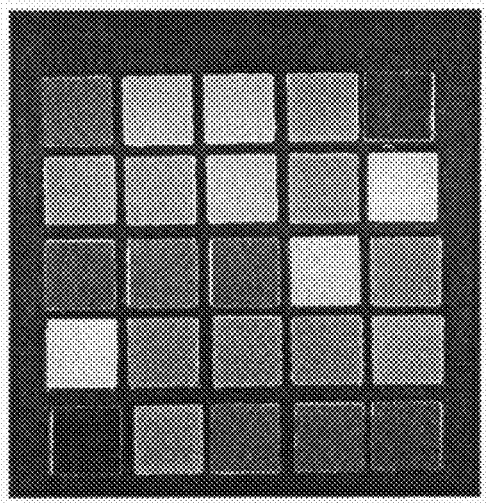
FIG. 6(a) shows the raw image of the color image.
Figure 6B:
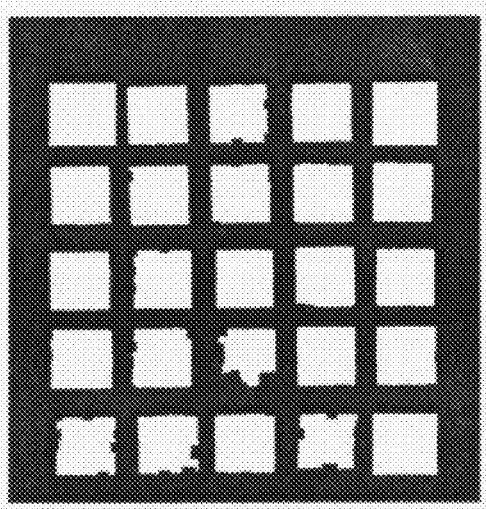
FIG. 6(b) shows the results of the automatic color patch finder.
Figure 6C:
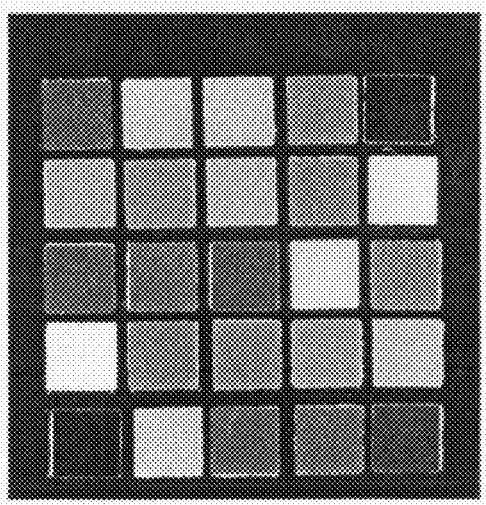
FIG. 6(c) shows the calibrated image.

The color transformation process is illustrated by the following figures: The original image is shown in FIG. 6(a), while FIG. 6(b) shows the result of automatically extracting the position and color values for the color patches, and FIG. 6(c) shows the final calibrated color target image.

Calibration Unit Design

The calibration unit is designed to fully automate the data acquisition process of calibration and instrument characterization targets at the clinical sites. The unit, as shown in FIG. 7, consists of three main parts:
1) a motorized filter wheel,
2) calibration targets, and
3) a light shielding tube.

Figure 7:
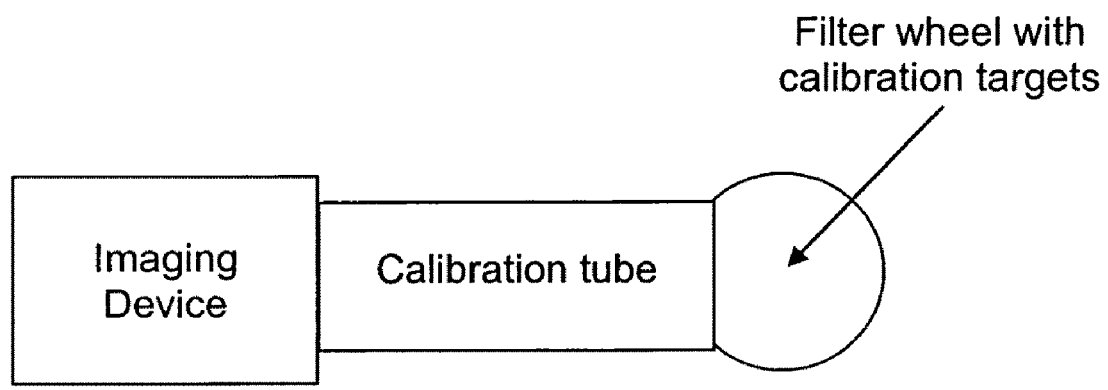
FIG. 7 shows the calibration unit (calibration tube, filter wheel, and calibration targets) attached to the imaging device.

FIG. 7 shows the calibration unit attached to the imaging device.

Several calibration targets including a gray target and a color target for gray and color calibration, as well other targets for, e.g., stereoscopic image calibration, resolution, focus, and depth-of-focus verification can be mounted on the filter wheel.

The filter wheel is motorized and switches the calibration targets automatically. The light shielding tube is used to mimic the lighting condition when exam data is acquired. The calibration images are acquired on a regular basis at the clinical site by the operator, who controls the system through a calibration acquisition program. The process is highly automated and requires only three steps to be performed:
1) connecting the calibration unit to the colposcope,
2) starting the calibration program, and
3) removing the calibration unit.

The entire image acquisition process is fast and requires no supervision by the operator. After the acquisition of calibration data, the digital colposcope is ready for acquiring exam data.

While the present invention has been particularly shown and described with reference to embodiments described in the detailed description and illustrated in the figures, it will be understood by one skilled in the art that various changes in detail may be effected therein without departing from the spirit and scope of the invention, as defined by the claims. Accordingly, no limitations are to be implied or inferred except as explicitly set forth in the claims.

INDUSTRIAL APPLICABILITY

This invention provides possible extensions for color calibration of other tissues and organs and is not limited to the cervix. These calibration methods may also be suitable for other tissue diagnosis instruments and other methods for such a system that automatically analyses and adjusts the quality of acquired images.

We claim:

1. A method of automated image calibration that corrects for non-uniform illumination of a subject and calibrates color, comprising:

providing an imaging device with a single instrument light source and a single detector, wherein said light source and said detector are uncalibrated;

supplying a gray target of known ground truth reflectivity and a color target of known ground truth reflectivity;

collecting raw image data of said subject and calibration image data in RGB color space under substantially identical illumination conditions, wherein said calibration image data comprises an image of said gray target obtained when said detector records native reflectivity from said gray target and an image of said color target obtained when said detector records native reflectivity from said color target, and wherein said image of a color target contains color patches, each of said patches having a native position value and a standard color value for said RGB color space;

applying a gray balance algorithm which uses said image of said gray target to said raw image data and said image of a color target to produce a gray balanced raw image and a gray balanced image of a color target, wherein said gray balanced raw image and said gray balanced image of a color target are flat-field images with normalized light distribution; and performing color transformation by extracting said native position value and determining a native color value for each of said color patches, calculating a color correction matrix between said native color values and said standard color values, and applying said matrix to said gray balanced raw image to correct for color inaccuracies, without knowledge of characteristics of said light source and said detector.

2. A method of automated image calibration that corrects for non-uniform illumination of a subject and calibrates color, comprising:

providing an imaging device with a single instrument light source and a single detector, wherein said light source and said detector are uncalibrated;

supplying a gray target of known ground truth reflectivity and a color target of known ground truth reflectivity;

collecting raw image data of said subject and calibration image data in RGB color space under substantially identical illumination conditions, wherein said calibration image data comprises an image of said gray target obtained when said detector records native reflectivity from said gray target and an image of said color target obtained when said detector records native reflectivity from said color target;

converting said raw image data and said calibration image data to a second color space, wherein said image of a color target contains color patches, each of said patches having a native position value and a standard color value for said second color space;

applying a gray balance algorithm which uses said image of said gray target to said raw image data and to said image of a color target to produce a gray balanced raw image and a gray balanced image of a color target, wherein said gray balanced raw image and said gray balanced image of a color target are flat-field images with normalized light distribution; and performing color transformation by extracting said native position value and determining a native color value for each of said color patches, calculating a color correction matrix between said native color values and said standard color values, and applying said matrix to said gray balanced image raw image data to correct for color inaccuracies, without knowledge of characteristics of said light source and said detector.

3. A method according to claim 2, wherein said second color space is selected from the group consisting of CIE Lab color space, HSL color space, CMYK color space, CIE-Luv color space, HSV color space or CIE XYZ color space.

* * * * *